Figure 1:
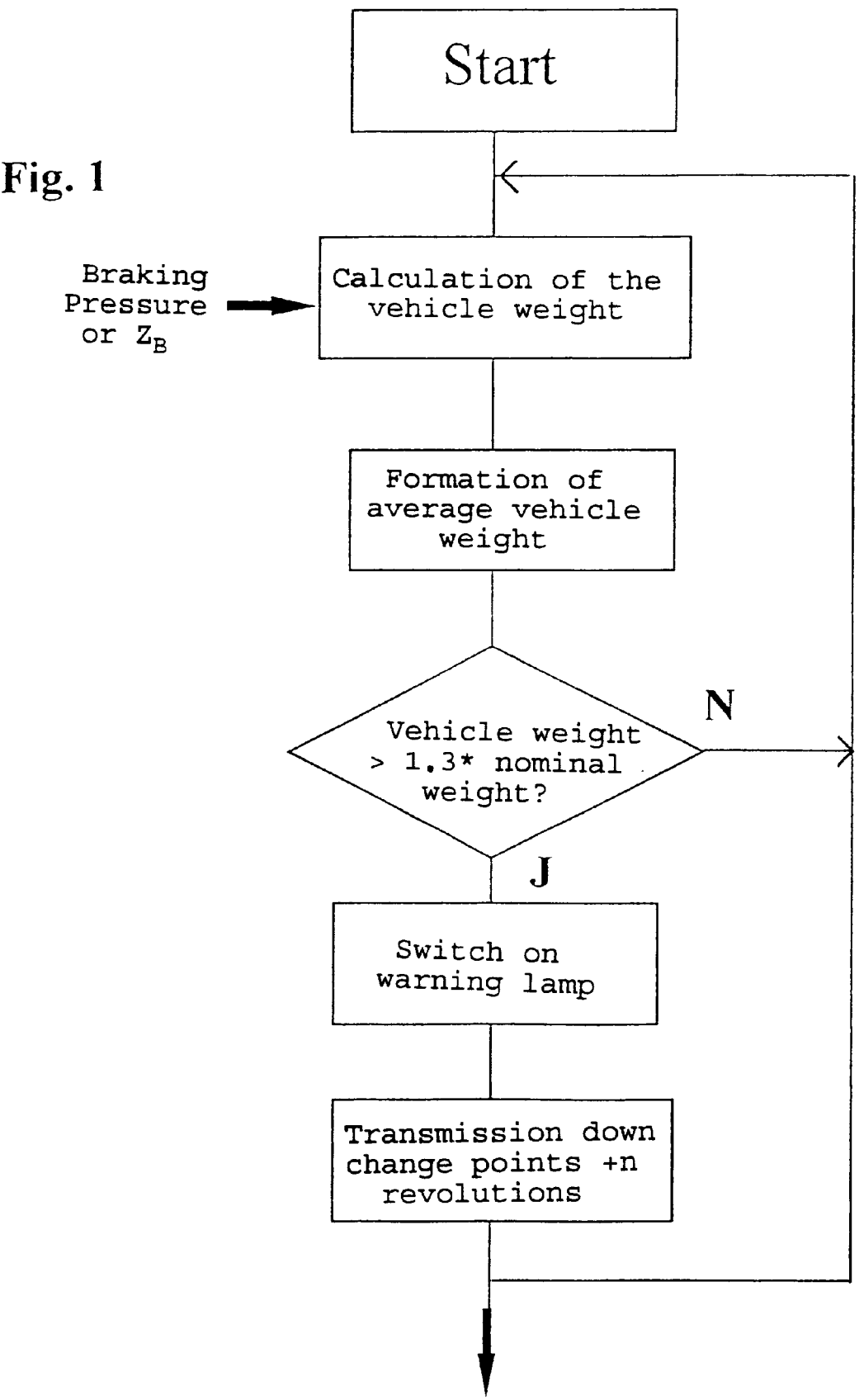

United States Patent

Bieber

Patent Number: 5,928,107
Date of Patent: Jul. 27, 1999

[54] METHOD FOR CONTROLLING AND MONITORING OF A DRIVING MODE OF A MOTOR VEHICLE

[75] Inventor: Gerold Bieber, Langenargen, Germany

[73] Assignee: ZF Friedrichshafen AG, Friedrichshafen, Germany

[21] Appl. No.: 08/954,138

[22] Filed: Oct. 20, 1997

[30] Foreign Application Priority Data

Nov. 20, 1996 [DE] Germany .......................... 196 48 033

[51] Int. Cl.⁶ .............................. F16H 59/60; F16H 59/48
[52] U.S. Cl. .............................. 477/97; 477/120; 701/51; 701/55
[58] Field of Search ........................ 477/97, 120; 701/51, 701/55

[56] References Cited

U.S. PATENT DOCUMENTS

| | | | |
|---|---|---|---|
| 5,487,005 | 1/1996 | Genise | 364/424.1 |
| 5,490,063 | 2/1996 | Genise | 477/120 |
| 5,510,982 | 4/1996 | Ohnishi | 477/120 |
| 5,517,410 | 5/1996 | Nakagawa | 701/51 |
| 5,669,847 | 9/1997 | Kashiwabara | 477/120 |

FOREIGN PATENT DOCUMENTS

| | | |
|---|---|---|
| 0 666 435 A2 | 8/1995 | European Pat. Off. . |
| 0 695 930 A1 | 2/1996 | European Pat. Off. . |
| 0 695 931 A1 | 2/1996 | European Pat. Off. . |
| 0695930A1 | 2/1996 | European Pat. Off. ............... 477/120 |
| 32 46 201 A1 | 6/1984 | Germany . |
| 34 29 184 C2 | 2/1986 | Germany . |
| 35 34 022 A1 | 3/1987 | Germany . |
| 41 22 083 A1 | 1/1993 | Germany . |
| 43 19 080 A1 | 12/1993 | Germany . |
| 42 35 570 A1 | 4/1994 | Germany . |
| 43 06 532 A1 | 9/1994 | Germany . |
| 44 42 487 C1 | 3/1996 | Germany . |
| WO 93/18375 | 9/1993 | WIPO . |

Primary Examiner—Rodney H. Bonck
Assistant Examiner—Tisha D. Waddell
Attorney, Agent, or Firm—Davis and Bujold

[57] ABSTRACT

For testing the operation of the braking system of vehicles, in particular heavy trucks having an automatic multi-ratio mechanical transmission, an estimate for the total weight of the vehicle is formed on the basis of the vehicle's own parameters and driving parameters. If account is taken for the braking force or the acceleration in this calculation, in case of considerable deviations of the calculated vehicle weight from a threshold value, it can be concluded that a defect exists in the braking system of the vehicle. In this case, an alarm signal is given to the driver of the vehicle and/or directly geared to the operation of the mechanical transmission.

13 Claims, 2 Drawing Sheets

METHOD FOR CONTROLLING AND MONITORING OF A DRIVING MODE OF A MOTOR VEHICLE

The invention concerns a method of controlling and monitoring the driving mode of a motor vehicle and, in particular, the braking operation of a heavy truck fitted with a automatic multi-ratio mechanical transmission.

EP-A2-0 666 435 disclosed calculating the total weight of the vehicle, including the load, from different parameters coordinated with the vehicle and the existing driving mode and using said total weight as a control parameter, especially for the automatic mechanical transmission. In this manner, it is ensured that the mechanical transmission is always driven in the optimum gear so that even eventually dangerous situations can be better controlled. The calculation are determined for two consecutive moments, which are preferably about four seconds apart, the torque on the wheels, the vehicle acceleration and the diameters of the wheels, according to which the total weight, can be determined by linking said parameters.

According to EP-A1-0 695 931, this method can be further improved by averaging a plurality of such consecutive calculations and forming an averaged estimate rate of the total weight therefrom, which naturally is more precise than a value based only on two determinations.

The calculated estimate of the total weight, together with said control of the transmission can also be used for control of the braking system, for example, adjusting the braking pressure.

The problem on which the invention is based is to extend the method of the above mentioned kind in the sense of making it also possible to monitor and control other vehicle parameters by means of the calculated estimate of the total weight of the motor vehicle.

According to the invention this problem is solved by the features of the invention.

In accordance with the invention, the force calculated from the vehicle parameters, which acts on the wheel of the motor vehicle, is equated with the traction determined from the motion equation of the vehicle, the weight of the motor vehicle being used as a variable in said motion equation. When, during the equating, a weight of the vehicle is found which is outside a reasonable value, for example, the nominal weight of the motor vehicle, it can be concluded that a defect exists in the system of the motor vehicle. Especially when a braking force is used as a force acting on the wheel, it can be immediately concluded whether or not the braking system of the motor vehicle is capable of operation.

From the braking pressure, a deceleration force to be expected on the vehicle wheel is preferably given here similar to the engine torque so that, upon a comparison of both forces, deviations of the vehicle weight are detected as braking defects.

Other embodiments of the invention result from the subclaims.

Figure 2:
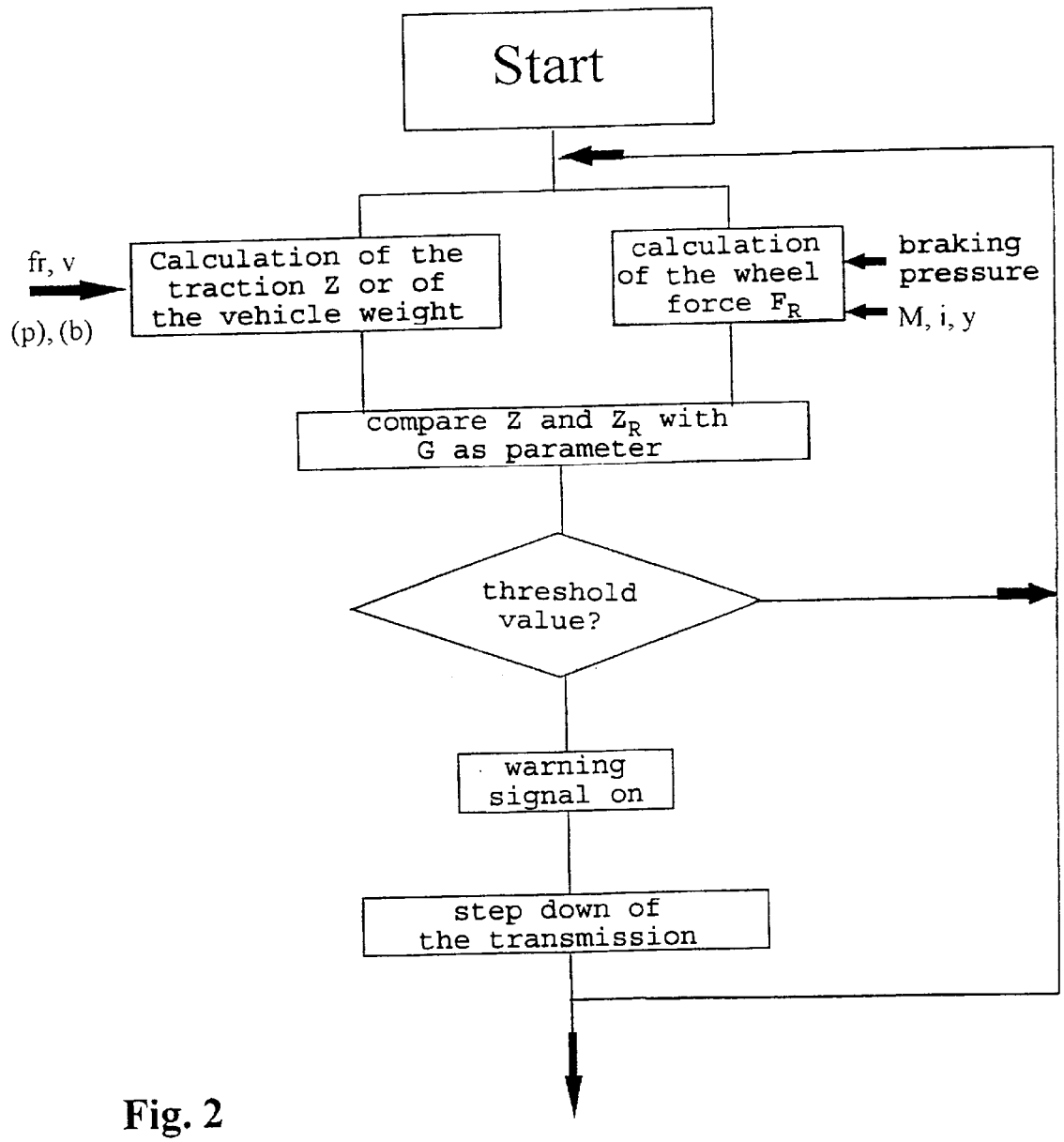

The invention is explained in detail in an embodiment with the aid of the drawings. In the drawings:

FIG. 1 is a flow chart explaining the method, according to the invention, for testing the driving mode and, in particular, the braking operation of a truck; and FIG. 2 is a detailed flow chart of the method according to the invention.

The motion equation of a vehicle is:

$$Z = F_R + F_L + F_{st} + F_B$$

In this equation, Z is the traction applied which is balanced with the force $F_R$ for overcoming the rolling resistance, the force $F_L$ for overcoming the air resistance, the force $F_{st}$ for overcoming the road gradient and $F_B$ the force to be applied for an acceleration. Said parameters can here be expressed by:

$$F_R = G \times f_r;$$

$$F_L = 0.5 \rho \times c_w \times A \times v^2;$$

$$F_{st} = G \times p; \text{ and}$$

$$F_B = G \times b/g.$$

In these equations, G means the existing vehicle weight including the weight of the load, $f_r$ the rolling resistance, $\rho$ the air density, $c_w$ the air resistance coefficient, A the transverse cross-sectional surface of the motor vehicle, v the velocity of the vehicle, b the acceleration of the vehicle, and g the acceleration due to gravity. The rolling resistance is constant, to a great extent, and so is the air resistance value; the velocity and the acceleration of the vehicle are known from the vehicle data.

The force $Z_R$ acting on the vehicle wheel holds the balance with the traction and, as known per se, is determined as follows:

$$Z_R = M(i_a \times Y_a \times i_{trans.} \times Y_{trans.})/r_{dyn}$$

In this equation, M means the engine torque, $i_a$ the axle ratio, $Y_a$ the efficiency of the axle, $i_{trans.}$ the transmission ratio, and $Y_{trans.}$ the efficiency of the transmission; while $r_{dyn}$ is the dynamic tire radius. In a moving vehicle, M is known from the engine electronics, $i_a$ and $Y_a$, the same as $r_{dyn}$, from the vehicle design and finally $i_{trans.}$ and $Y_{trans.}$ from the gear engaged.

When the traction Z and the force $Z_R$ acting on the wheel are accordingly equated, the total weight G of the vehicle can be determined with sufficient accuracy. Approximations here can be taken up insofar as the acceleration is assumed to be very small and at zero for a first approximation, the gradient p likewise, so that in an approximation formation for the vehicle weight the parameters $F_{st}$ and $F_b$ on the right side of the motion equation can be disregarded. This can occur especially when, for the calculation of the estimate for the total weight, an average formation by a plurality n of estimates being added up within a logical period of time and divided by the number n results.

The above equations naturally apply also when the force acting on the wheel is a braking force $Z_B$. In motor vehicles, said braking force is a function of the braking pressure, in heavy trucks, which usually have pneumatically actuated brakes, it is directly a function of the pneumatic braking pressure. When said decelerating force $Z_B$ or the correspondingly modified braking pressure is accordingly given similarly to the engine torque, in the above indicated equation, and in the calculation resulting therefrom of the vehicle weight, deviations appear in comparison to otherwise determined estimates for the vehicle weight, it can be concluded that the braking system is defective or not fully capable of operation.

When the estimate for the calculated vehicle weight increases greatly, during a deceleration, going endlessly in a direction in the critical case, this is a sign that the braking system has failed. Said failure, e.g. overheating of the lining, wear of the lining, etc., cannot be detected by an ABS (anti-blocking system).

When in a tractor and trailer vehicle, the vehicle weight calculated during braking more or less doubles relative to the otherwise calculated estimate, it can be concluded that the braking system of the trailer or of the tractor is defective or at least partly incapable of operation.

When the calculated vehicle weight during accelerations increases, relative to the otherwise determined estimate or a known value, it can be concluded from this that the brake is at least partly engaged.

In all these calculations, the calculated weight of the vehicle thus increases not inconsiderably. Hereby a reliable criterion is created which shows that the braking system of the motor vehicle is not fully capable of operation. As soon as the calculated vehicle weight exceeds a certain threshold value, a warning signal is given to the driver of the motor vehicle and, in addition, is geared into the vehicle control, for example, by gradually shifting the mechanical transmission to lower and lower gears in order to ensure reliable stoppage of the trucks after which the defect can be removed. Said threshold value can be preset at a high value; but in most cases it is enough to equate the threshold value with the nominal value of the motor vehicle increased by a specific factor. The factor can lie between 1.2 and 1.5, for example, at 1.3.

During down shifts, it is possible in these emergencies to admit transmission down-shift points at speeds lying above the usually admissible speeds.

In FIG. 1 a simple flow chart for the method described is given. After starting the vehicle, an estimate is calculated for the total weight of the vehicle, according to the above equations or according to the method corresponding to the above cited European patent applications in which an averaging results by subsequently adding up chronologically consecutive estimates and dividing by the number of estimates to determine the vehicle weight. An added input is the cited braking force $Z_B$ depending on the pertaining braking pressure. When the estimate of the calculated vehicle weight is less than a preset threshold value, in this case 1.3 times the nominal weight, it is concluded therefrom that the braking system is in order; the process described is continuously repeated.

However, if the determined estimate of the vehicle weight exceeds the preset threshold value, a warning light is then switched on to inform the driver and the transmission is correspondingly down shifted. Here again the process also repeats itself from the beginning.

In the flow chart of FIG. 2, after start the traction is first calculated according to the above given motion equation with the estimate for the vehicle weight G as a variable. Parallel to this, the wheel force acting on the wheels of the vehicle is optionally calculated taking into account the braking force and, for this purpose, the value of the braking pressure is indicated as an input parameter. Here an average is also calculated, via several calculation steps, as carried out above; but this is not shown in detail in the flow chart of FIG. 2.

By comparing the traction and the force acting on the wheels, taking into account the braking force, with the estimate G of the vehicle weight as a parameter, it is again tested, as above described for FIG. 1, whether or not the vehicle weight exceeds a threshold value. The other method steps are carried out the same as in FIG. 1.

In the special embodiments, according to FIGS. 1 and 2, a value above the nominal value of the vehicle was mentioned as the threshold value; evidently it is also possible to use, as a threshold value, a value which is above the estimate determined over a long period of time for the vehicle weight by a specific amount.

I claim:

1. A method for controlling and monitoring a mode of driving of a motor vehicle having an automatic multi-ratio mechanical transmission, the method comprising the steps of:

calculating an estimate for a total weight of the vehicle from a motion equation of the motor vehicle, taking into account an applied decelerating force;

comparing said estimate with a preset threshold value;

providing an alarm signal if said estimate exceeds said threshold value;

calculating a force acting on wheels of the motor vehicle from the following parameters of the vehicle: engine torque, a ratio of a drive train, an efficiency of the drive train, and a wheel geometry;

calculating a traction from the motion equation of the vehicle from the following driving parameters: rolling resistance, air resistance, a road gradient and a vehicle acceleration, with the vehicle weight being a variable; and comparing the calculated force and the calculated traction and, if the calculated vehicle weight established by the comparison differs substantially from a threshold value, providing an alarm signal.

2. The method according to claim 1, further comprising the step of calculating a force acting on the wheels of the vehicle by the formula:

$$Z_R = M(i_a \times y_a \times i_{trans.} \times y_{trans.})/r_{dyn};$$

wherein M is engine torque, $i_a$ is an axle ratio, $y_a$ is an effectiveness of the axle, $i_{trans.}$ is a transmission ratio, $y_{trans.}$ is an effectiveness of the transmission; and $r_{dyn}$, is a dynamic tire radius; and calculating a traction (Z) from the motion equation of the vehicle by the formula:

$$Z = F_R + F_L + F_{st} + F_B$$

with $F_R = G \times f_r$; $F_L = G3 \times C \ v^2$; $F_{st} = G \times p$ and $$F_B = G \times b/g;$$

wherein G is the calculated estimate weight of the vehicle;

$f_r$ is a constant representing rolling resistance;

C is a constant representing air resistance;

p is a factor indicative of gradient of a road;

b is vehicle acceleration; and g is an acceleration caused by gravity.

3. The method according to claim 2, further comprising the step of obtaining the total weight of the vehicle from an average of several calculations.

4. The method according to claim 3, further comprising the step of, upon providing said alarm signal, altering parameters of the transmission control to allow a down shift at a speed higher than a speed normally used for a down shift.

5. The method according to claim 1, further comprising the step of obtaining the total weight of the vehicle from an average of several calculations.

6. The method according to claim 5, further comprising the step of calculating said vehicle weight by an approximation with the gradient of the road and the acceleration of the vehicle each being a value approaching zero.

7. The method according to claim 5, further comprising the step of, upon providing said alarm signal, altering parameters of the transmission control to allow a down shift at a speed higher than a speed normally used for a down shift.

8. The method according to claim 1, further comprising the step of, upon providing said alarm signal, altering parameters of the transmission control to allow a down shifts at a speed higher than a speed normally used for a down shift.

9. A method for controlling and monitoring a mode of driving of a motor vehicle having an automatic multi-ratio mechanical transmission, the method comprising the steps of:

calculating an estimate for a total weight of the vehicle from a motion equation of the motor vehicle, taking into account an applied decelerating force;

calculating a force acting on the wheels of the vehicle by the formula:

$$Z_R = M(i_a \times y_a \times i_{trans.} \times y_{trans.}) R_{dyn}$$

wherein M is engine torque, $i_a$ is an axle ratio, $y_a$ is an effectiveness of the axle, $i_{trans.}$ is a transmission ratio, $y_{trans.}$ is an effectiveness of the transmission; and $r_{dyn}$ is a dynamic tire radius;

calculating a traction (Z) from the motion equation of the vehicle by the formula:

$$Z = F_R + F_L + F_{st} + F_B$$

with $F_R = G \times f_r$; $F_L = G3 \times C \ v^2$; $F_{st} = G \times p$ and $$F_B = G \times b/g;$$

wherein G is the calculated estimate weight of the vehicle;
$f_r$ is a constant representing rolling resistance;
C is a constant representing air resistance;
p is a factor indicative of the gradient of a road;
b is vehicle acceleration; and
g is an acceleration caused by gravity;

comparing said estimate with a preset threshold value; and providing an alarm signal if said estimate exceeds said threshold value.

10. The method according to claim 9, further comprising the step of obtaining the total weight of the vehicle from an average of several calculations.

11. The method according to claim 10, further comprising the step of calculating the vehicle weight by an approximation with the gradient of the road and the acceleration of the vehicle each being a value approaching zero.

12. The method according to claim 10, further comprising the step of, upon providing said alarm signal, altering parameters of the transmission control to allow a down shift at a speed higher than a speed normally used for a down shift.

13. The method according to claim 9, further comprising the step of, upon providing said alarm signal, altering parameters of the transmission control to allow a down shifts at a speed higher than a speed normally used for a down shift.

* * * * *